United States Patent [19]

Jackson

[11] 4,000,380
[45] Dec. 28, 1976

[54] TOLL RESTRICTOR FOR TOUCH TYPE DIGIT SELECTOR

[75] Inventor: Joseph Monroe Jackson, Menlo Park, Calif.

[73] Assignee: Litton Business Telephone Systems, Inc., Sunnyvale, Calif.

[22] Filed: Mar. 27, 1975

[21] Appl. No.: 562,569

Related U.S. Application Data

[63] Continuation-in-part of Ser. No. 558,302, March 14, 1975.

[52] U.S. Cl. .......................... 179/90 D; 179/18 DA
[51] Int. Cl.² ............................................ H04M 1/66
[58] Field of Search ........ 179/90 D, 18 DA, 189 D, 179/6.3 R

[56] References Cited
UNITED STATES PATENTS

| | | | |
|---|---|---|---|
| 3,681,536 | 8/1972 | Pask et al. | 179/18 DA |
| 3,727,007 | 4/1973 | Catlin | 179/18 DA |
| 3,757,055 | 9/1973 | McCann et al. | 179/90 P |

Primary Examiner—Kathleen H. Claffy
Assistant Examiner—Gerald L. Brigance
Attorney, Agent, or Firm—Ronald M. Goldman

[57] ABSTRACT

Improved means are disclosed to prevent a restricted local telephone substation or set from dialing long distance telephone calls by counting the number of digits dialed at the station and preventing the sending of additional digits once the count attains a predetermined number. An electronic counter and a Nand gate latch circuit are arranged in a novel manner in which responsive to the local station going off-hook the Nand gate latch is set into a second condition and the counter is enabled to receive and count pulses from the substation. Means coupled to an output of the counter reset the Nand gate latch to its first condition should the count exceed the predetermined number. Additional means are included in combination by which the dialing of the digit zero as the first digit of a called number also results in resetting the latch.

1 Claim, 1 Drawing Figure

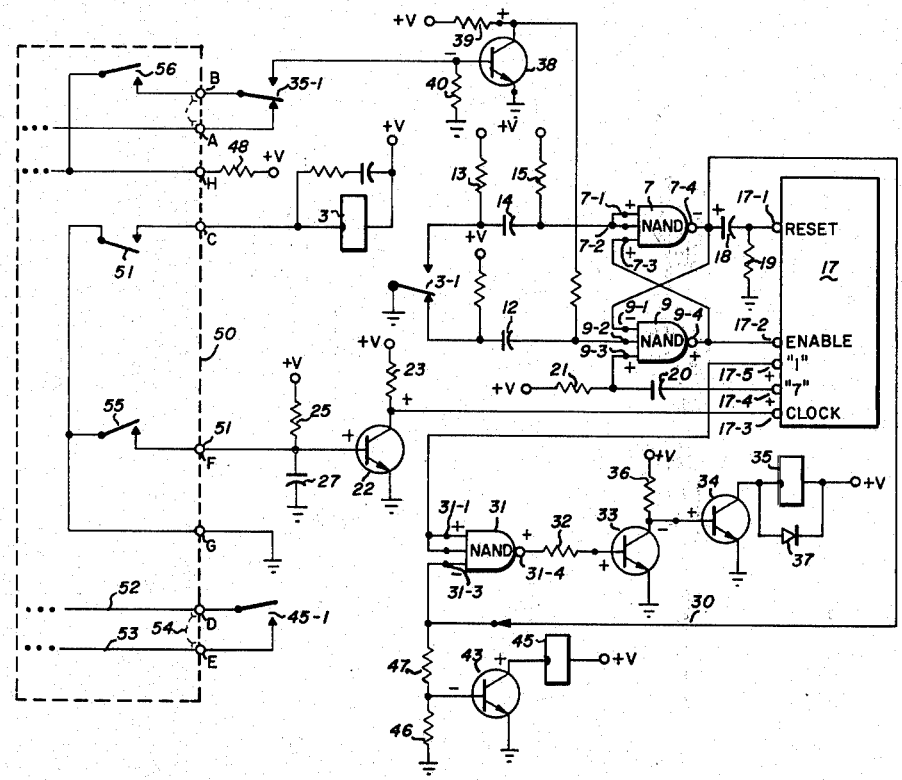

TOLL RESTRICTOR FOR TOUCH TYPE DIGIT SELECTOR

This application is a continuation-in-part of my prior application entitled TOUCH TONE TOLL RESTRICTOR, Ser. No. 558,302, filed Mar. 14, 1975.

BACKGROUND OF THE INVENTION

1. Field of the Invention

This invention relates to toll restricting telephone apparatus and, more particularly, to an improved attachment apparatus for preventing the placement of long distance telephone calls from a restricted telephone set.

2. Description of the Prior Art

It has heretofore been known to provide toll restriction circuits on various telephones in a telephone system so as to prevent the use of those telephones for long distance telephone calls for obvious reasons of economy. In the prior art system of which I have knowlege, restrictive equipment was maintained at the central station which received the full information on the called number, determined whether the called number was a long distance call, and determined whether the telephone station from which the call was placed is authorized to make such long distance calls and when that determination was negative the line was disabled and the call was not completed.

Currently many users install private automatic branch exchanges (PABX) which they interconnect to telephone company lines. Ideally it is desired to restrict some of the telephone stations within the PABX system from initiating off-premises long distance telephone calls without disturbing the other substations therein or without requiring the installation of expensive circuitry of the aforementioned type frequently found in central stations.

Toll restricting devices for the foregoing application have been made known to me in U.S. Pat. No. 3,727,007 to Catlin, granted Apr. 10, 1973, and in U.S. Pat. No. 3,757,055 to McCann, granted Sept. 4, 1973. In each of the toll call restrictors disclosed in the aforecited patents, means are provided to terminate the placement of the telephone call if the number of digits dialed exceeds that necessary for a local call or if the initial digit or digits dialed represents an attempt to reach a long distance telephone operator. The present invention is directed to a similar type of toll restricting apparatus.

In my prior application, application Ser. No. 558,302, filed Mar. 14, 1975, referred to and incorporated herein in its entirety, I present what I believe to be a novel apparatus and method for preventing placement of long distance telephone calls from a restricted local station by counting the number of digits dialed at that station and once the count attains a predetermined number, such as the predetermined number of digits representative of a local call, by preventing the sending of the further digits necessary to complete the identification of the long distance station. In the embodiment disclosed in that application, I employ as part of the elements thereof a shift register, a pair of Nand gate latches and various trigger circuits associated therewith. In accomplishing the aforedescribed purpose and to prevent dialing of a zero as the initial digit, the electronic shift register requires the insertion of an initial information bit. Additionally inverters were required to couple the output from the counter to the respective Nand gate latches. Such a circuit I found to be more complicated and thus less reliable than desired.

SUMMARY OF THE INVENTION

In accordance with the foregoing object of restricting individual telephone substations from successively making long distance telephone calls and by way of improvement upon my prior means containing means for counting the number of digits being sent by a calling party and means responsive to an excess count for disabling the telephone dial circuit so as to prevent the transmission of additional digits, I employ an electronic counter of the kind having a reset input, an enable input, a clock input, and a plurality of outputs representative of the count formed by the counter, including one output and an N output, where N represents a number such as 7, and a pair of Nand gates formed into a single Nand gate latch. The Nand gate latch includes two outputs and at least three inputs and is stable in each of two conditions. By going into the off-hook position, means are provided to set the latch in a first condition so as to properly bias the enable input of the counter and means responsive to the operation of the digit selecting mechanism in the station provides a corresponding number of pulses to the clock input. Means are provided responsive to an output from the Nth counter output to reset the Nand gate latch so as to prevent further transmission of digit representative signals. Additional means are provided which tests the substation for an initial zero responsive to an output at the one output of the counter and in response to the detection of zero similarly provides an input to the latch which results in said latch switching to its normal condition and in so doing resets the counter.

The foregoing and other objects and structure characteristic of my invention as well as modifications and improvements thereto becomes more apparent to one skilled in the art upon giving consideration to the detailed description of the preferred embodiment of the invention which follows, taken together with the FIGURE of the drawing illustrating the embodiment in a schematic form understood by those skilled in the art.

DESCRIPTION OF THE PREFERRED EMBODIMENTS

The preferred embodiment presented in the FIGURE includes an electromechanical type relay having a winding 3. The relay includes a set of transfer contacts 3–1 which, as illustrated, consists of a break contact, a make contact, and a transfer contact, the latter of which pivots from a normal position in contact with the break contact, as illustrated, to a position in contact with the make contact when the relay is energized.

The transfer contact of relay contact set 3–1 is connected to electrical ground as indicated in the FIGURE. The break contact is connected in series circuit with capacitor 12 to input 9–2 of Nand gate latch 9. A resistor 11 is connected between the voltage source +V and the side of capacitor 11 most proximate in circuit the break contact. The make contact of relay contact set 3–1 is connected in series circuit with capacitor 14 to the inputs 7–1 and 7–2, which are joined together. Resistor 13 is connected in circuit between source +V and one end of capacitor 14, as illustrated, and a second resistor 15 is connected between source +V and the other end of capacitor to form a "differentiator" circuit.

A first Nand gate 7 is provided and contains three inputs, 7–1, 7–2, and 7–3, and an output 7–4; a second Nand gate 9 is provided and contains three inputs, 9–1, 9–2 and 9–3, and an output 9–4. The Nand gate is a conventional semiconductor switch element which possesses the characteristic of having a "logic high" output in all cases except when all inputs are "logic high"—the output is then, and only then, "logic low."

By way of specific example, the Model 14023, available from the Motorola Company of Phoenix, Arizona, is a suitable Nand gate.

The Nand gates 7 and 9 are connected further in a latching circuit familiar to those skilled in the art. Thus output 7–4 of one gate is connected to input 9–1 of the other gate and output 9–4 of the other gate is connected to input 7–3 of the former gate 7. A solid state metal oxide semiconductor, CMOS, type electronic counter 17 is symbolically illustrated in the FIGURE. Such an electronic counter is a conventional commercially available electronic device of well known characteristics, as explained in the literature, one specific example of which is available from the Motorola Company as Model No. 14017. The counter includes a reset input terminal 17–1, an enabling input 17–2, a clock input terminal 17–3, a first position output terminal 17–5 and a seventh position output terminal 17–4. Other inputs and outputs are normally found on the electronic counter but they are not employed in this circuit and hence are neither illustrated or described.

Output 7–4 of Nand gate 7 is connected through a voltage differentiating circuit consisting of series capacitor 18 and resistor 19, connected between input 17–1 and ground, to input 17–1. Output 9–4 of Nand gate latch 9 is connected to the enable input 17–2 of the counter. Seventh position output 17–4 is connected in series circuit with capacitor 20 and to input 9–3 of the Nand gate and resistor 21 is connected between input 9–3 and source +V to form with the capacitor a conventional differentiator circuit. A switching transistor 22 includes an emitter, base, and collector as illustrated by conventional symbol. The collector is connected in series with resistor 23 to source +V; its emitter is connected to electrical ground; and the base is connected to the circuit input 51. A resistor 25 is connected between the source +V and the base of transistor 22 and a capacitor 27 is connected between the base and ground. The collector of transistor 22 is also connected in circuit with clock input 17–3 of electronic counter 17 as illustrated. The transistor is configured in a conventional switching circuit in which an input voltage is applied to the base and an output voltage is derived at the collector.

An additional Nand gate 31 includes inputs 31–1, 31–2 and 31–3 and an output 31–4. Input 31–1 and 31–2 are connected electrically together and to the position 1 output 17–5 of counter 17. Input 31–3 is connected in circuit with the output 7–4 of Nand gate 7 by lead 30. Output 31–4 is connected in series with resistor 32 to the base of a switching transistor 33. Transistor 33 together with a transistor 34, which inverts the output from transistor 33, forms a conventional driver circuit for a relay 35. A resistor 36 connects the collector of transistor 33 to the source +V and the emitter thereof, as illustrated, is connected to electrical ground potential. The collector additionally is connected to the base of transistor 34. The emitter of transistor 34 is connected to ground and the collector is connected in an electrical series circuit with the winding of relay 35 to source +V. A diode 37 is connected across the relay winding to form a protective voltage shunt.

Relay 35 includes a set of transfer contacts 35–1 located at the upper left side of the figure, which consists of a make contact, a break contact, and a transfer contact. The break contact is connected electrically to terminal A and the transfer contact is connected electrically to terminal B as shown. The make contact is connected to the base of another switching transistor 38, suitably an NPN type. Transistor 38 has its collector connected to one end of bias resistor 39 and the other end of the resistor is connected to source +V. The emitter is connected to electrical ground potential as shown. A bias resistor 40 is connected between the transistor base and electrical ground potential.

The collector of transistor 38, which provides the output voltage, is as shown connected in circuit with one end of resistor 42, which in turn has its other end connected in circuit with input 9–2 of Nand gate 9. Switching transistor 43, suitably a NPN type, as well as an associated electromechanical type relay 45, are provided and connected in a conventional relay driver circuit. The coil of relay 45 is connected in series between source +V and the collector of transistor 43. The emitter of transistor 43 is grounded. A bias resistor 46 is connected between ground and the base of transistor 43 and a resistor 47 is connected in series between the base of transistor 43 and output 7–3 of Nand gate 7. Relay 45 includes a set of make contacts 45–1 which are connected electrically to the respective terminals D and E.

A telephone instrument of conventional structure familiar to those skilled in the art is represented symbolically by the dash lines 50. To assist the reader to understand the invention and its operation, those elements of the telephone pertinent to the invention are schematically illustrated. Thus the telephone unit contains a hookswitch having at least a hookswitch contact 51, which is normally open with the telephone handset, not illustrated, at rest in the cradle, also not illustrated. Two electrical leads 52 and 53 are included which form part of an electrical series circuit with the output of the "touch tone" multifrequency digit selecting and signalling mechanism, not illustrated, and a bridging lead 54, represented in dash lines. The digit selecting or dialing mechanism includes a switch 55, which is normally open, that closes each time the digit selection mechanism is operated by the user. And the digit selecting mechanism further includes a normally open contact 56 which closes during the time when the 0 digit selector button on the mechanism is operated. Make contact 55 is wired between terminal B and a line 57 which is connected to terminal A. The bridging lead 58, represented by dash lines, is removed or broken when the toll restrictor is installed. A resistor 48 is connected between source +V and terminal H wherein it is placed in circuit with the transfer contact of contact set 56. A ground circuit lead electrically connects one side of hookswitch contacts 51 and dial contacts 55 in common to terminal G which in turn is connected to ground. Terminal C is connected in circuit to one end of the winding of relay 3 as shown.

With the source of power +V connected between the appropriate +V source terminal and ground terminal of the toll restrictor, the circuit elements described are placed in a standby condition. In the standby condition the relay contacts are in their normal position as illustrated in the FIGURE and the electronic elements are in the following condition. Transistor 38 is "off" and has a low at its base represented by a — symbol adjacent the base in the FIGURE and a high at its collector represented by the + symbol adjacent the collector in the FIGURE; transistor 22 is "off" and has a high on its base and a high at its collector; transistor 33 is "on" and has a high on its base and a high on its collector; transistor 35 is "off" with a low on its base and a high on its collector; transistor 43 is "off" and has a low on its base and a high on its collector. Nand gate 7 has a low at its output and a high at each of its inputs and the complementary Nand gate 9 has a high at its output and a low at input 9–1 and a high at each of its inputs; and Nand gate 31 has a high at its output and a low at input 31–3 and a high at its other inputs 31–1 and 31–2. The electronic counter 17 is in the Reset condition, awaiting suitable input signals, and a high appears at each of its outputs 17–5 and 17–4.

In operation, a party desiring to place a long distance telephone call removes the telephone handset from its cradle in the telephone instrument, and hookswitch contacts 51 close to complete a circuit from source +V relay winding 3 to electrical ground potential. Relay 3 is energized by current through the circuit and operates the transfer contact of contact set 3–1, moving it into contact with the make contact to apply ground potential to one end of capacitor 14. It is noted that resistor 4 and capacitor 5 serve to initially divert some current from relay coil 3 and hence make the relay somewhat slow to operate until capacitor 5 obtains sufficient charge. As is well known, this same circuit causes relay 3 to be slow to release once the hookswitch 51 is restored to its "on-hook" position, since the charge in the capacitor will cause a current to continue through the relay coil until the charge dissipates.

In the standby condition, input 7–1 is at a high positive potential as applied thereto from source +V through resistor 15. With ground applied to one end of capacitor 14 a charging current flows through resistor 15 into the capacitor resulting in a large voltage drop across the resistor and lowering the voltage at gate inputs 7–1 to a "low" until the charging current reduces. Hence by conventional "differentiation" action, a "low" pulse of short duration is produced and this low voltage pulse is applied to gate input 7–1. With a "low" at its input Nand gate 7 switches its condition changing its output voltage at output 7–4 from a "low" to a "high." The changing output voltage at 7–4 is differentiated by the capacitors 18 and resistor combination 19 resulting in a positive voltage pulse or spike which is applied to the reset input 17–1 of electronic counter 17.

The high at output 7–4 is also applied at input 9–1 of Nand gate 9. As is evident, input 9–2 is already at a high via resistor 42 and resistor 39 to source +V. Hence with all of its inputs at a high, Nand gate 9 changes its condition and provides a "low" at output 9–4 as well. This low is applied to input 7–3 of Nand gate 7 to place the Nand gates in a "latched" condition and is also applied to enable input 17–2 of the electronic counter to enable the counter. Essentially the Nand gates are "latched" into the new condition with the output of each Nand gate at a high.

The high at the output of Nand gate 7 is also applied to input 31–3 of Nand gate 31 and to one end of resistor 47 whereby the voltage at the base of transistor 43 is now at a high to bias the transistor into the current conduction condition. Transistor 43 switches "on" and conducts current over a circuit from source +V through relay winding 45 through the transistor to ground. The current energizes relay 35 and the relay operates and closes its contacts 45–1.

The closed contacts 45–1 complete an electrical series circuit between leads 52 and 53 in the digit selecting means circuit in the telephone instrument. As previously described, a completed circuit is necessary to permit transmission of the digit selecting signals over the telephone line, not illustrated.

The calling party operates the digit selecting mechanism, commonly referred to as the Touch-Tone dial, of his telephone set by depressing momentarily selected ones of a number of pushbuttons. Dial contact 55 closes each time any one of the digit selection pushbuttons is so depressed. Upon the first initiation of the digit selector, ground is applied at terminal F to the base of transistor 22, normally at a high, and, accordingly, transistor 22 switches "on," conducting current from +V through resistor 23 through the transistor collector causing a voltage drop across resistor 23 and the collector voltage goes low. The low is applied to clock input terminal 17–3 to prepare counter 17, since the counter is responsive only to a change from a low to a high at input 17–3. The depressed button in the touch-tone selector is released and the ground is removed from terminal F and thereby from the base of transistor 22 which switches back to "off." This in turn raises the collector voltage at clock input terminal 17–3 from low to high so that in effect a pulse has been applied to input 17–3.

The electrical circuitry in the electronic counter senses this first change and establishes a count of "one" and thereby presents a low at output 17–5, a signal representative of a count of one.

The high at output 17–5 is applied to the inputs 31–1 and 31–2 of Nand gate 31. As is recalled, the input at 31–3 was previously at a high, hence all inputs of Nand gate 31 are at high and as is conventional the output of the Nand gate switches to a low. With a low at output 31–4 the base of transistor 33 is now biased to cause the transistor to conduct current. Transistor 33 switches "on" to cause the collector voltage to go low and this "low" in turn is applied to the base of transistor 35. Transistor 35 thereupon switches on and draws current from the source through the winding of relay 35.

Relay 35 operates and moves its transfer contact of contacts 35–1 to the make position. This establishes a circuit between terminal B to the base of transistor 38. The further operation of this circuit aspect of the invention is deferred, since its purpose is to prevent the calling party from reaching the central station telephone operator.

When the number of digits dialed totals 7, a high appears at output 17–4. If no further digits are selected, the telephone call proceeds normally and the circuit remains in the described condition. Thus when Nand gate 7 switches into its on condition the base of transistor 43 is biased to switch that transistor into the conducting condition which results in current through relay coil 45. Operation of relay 45 in turn closes contacts 45a to permit dialing.

Alternatively assume that the party using the telephone operates the touch-tone selector again to send an eighth digit, as occurs when the calling party is attempting to place a direct dial long distance telephone call, the counter circuitry counts to 8.

In so doing, the output 17-4 changes from a low voltage value back to a high voltage as the counter circuits remove the seventh position output signal. This high is differentiated by capacitor 20 and resistor 21 to produce a "low" voltage pulse at input 9-3 of Nand gate 9 and Nand gate 9 changes its condition changing its output at 9-4 from a low to a high.

This high is applied to input 7-3 of Nand gate 7. With a high at all of its inputs, Nand gate 7 changes its condition from high to low at output 7-4. In turn the low is applied to input 9-1 to retain the Nand gates 9 and 7 in this new latched condition.

Moreover as gate 7 switches from high to low, a low pulse is produced and applied via capacitor 18 to the reset input 17-6 of counter 17 and the counter resets to its standby condition. The low at output 24 is also applied to the base of transistor 43 over lead 30 and the transistor reverts to its off condition interrupting current through relay winding 45. Relay 45 is de-energized and restores its contact 45-1 to the normally open position, interrupting the digit selecting circuit via leads 52 and 53.

Thus the calling party can no longer transmit any additional digit selecting information over the telephone line and he retains a dead telephone instrument in his hand.

Having noted the inability to complete the call, the party replaces the handset in its cradle and the station goes "on-hook." Hookswitch contacts 51 open and interrupts current to relay 3. After a short interval necessary to allow the shunt capacitor to discharge sufficiently through the relay winding, relay 3 deenergizes and restores its contacts 3-1 to the normal position. In so doing the transfer contact applies ground to the break contact going from a high to a low and the differentiator circuit, circuit resistor 11 and 12, applies a low voltage pulse to input 9-2 of Nand gate 9.

Nand gate 9 had previously been restored to its off condition automatically by reason of the improper attempt to place a toll call and the circuit is prepared for further use and the additional low pulse does not cause any change in the condition of Nand gate 7.

As in the case of the earlier invention, a circuit is provided in order to indicate whether the first selected digit of the calling station is zero as would occur in the case of a calling party attempting to reach the operator in order to have the operator place the long distance call. The circuits are placed in the condition for counting the number of digits as in the previous description of operation and at that stage of operation counter 17 has a low at output 17-5 and Nand gate 31 is switched into the on condition with a high at each of its inputs to provide a low output, transistor 33 is switched off and in turn transistor 34 is switched into its "on" or current conducting condition and current through transistor 34 energizes relay winding 35. Relay 35 is in an operated condition and its contact 35-1 are operated with the transfer contact in contact with the base of transistor 38 to prepare a partially complete circuit thereto. When the user depresses the 0 pushbutton on the digit selector, switch 56 closes to complete a circuit from +V and resistor 48 to the base of transistor 38. Transistor 38 is thus biased into its on condition and its collector voltage drops from a high positive to a low voltage. This low is applied to input 9-2 of Nand gate 9. Inasmuch as one input of the Nand gate is now at a low, the Nand gate switches into its off condition. In so doing the output of the Nand gate goes from a low to a high. As before, the high is applied to input 7-3 of Nand gate 7 and Nand gate 7 changes its state, changing its output 7-4 to a low, which is reapplied to an input of Nand gate 9 so that both gates are now "latched" into the new condition.

It is noted that Nand gates 7 and 9 are now in the same condition in which they appeared during the standby condition. With the low at output 7-4, transistor 43, which was biased "on" applied from output 7-4, switches "off" and thereby de-energizes relay 45. Relay 45 restores its contact 45-1 to normal, opening the electrical circuit between lines 52 and 53 in the telephone instrument. As described previously, when contact 45-1 is open, the calling party is unable to send any digit selecting information from his telephone instrument over the telephone line.

As is apparent from the schematic, when the user depresses the digit selecting pushbutton 0 to close contact 56, the multifrequency sending equipment in the telephone cannot send multifrequency tones representative of the digit 0 over the telephone lines. This is due to the operated condition of relay 35-1, which opens the points A and B on the multifrequency sending circuit for digit 0 when the counter is in the first position.

As before, the user finds his telephone instrument disabled and restores the handset to its cradle on the instrument base which opens hookswitch 51 and the circuits restore to the standby condition in essentially the same manner as heretofore described in connection wih attempts to dial direct a long-distance call.

The improved circuitry forming the present improvement invention thus accomplishes the desired function of restricting toll telephone calls and, in my opinion, is inherently more reliable than my prior invention.

It is believed that the foregoing detailed description of a specific embodiment of my invention is sufficient to teach one skilled in the art to make and use the invention. It is understood, however, that my invention is not limited to those details disclosed in connection with the foregoing description since various modifications and substitutions may be made and additional circuitry may be added by way of further improvement, all of which become apparent to one of ordinary skill upon reading the specification and which are all within the scope of my invention. Accordingly it is expressly understood that my invention is to be broadly construed within the full spirit and scope of the appended claims.

What I claim is:

1. A toll restricting apparatus for a telephone set of the kind that contains a hookswitch having an on-hook and off-hook condition when the set is not in use or is in use, respectively; a touch type digit-selecting means containing a plurality of digit-selecting switches for enabling sending of digit representative signals, said digit-selecting means including a common switch means operable in response to operation of each digit-selecting switch of said digit-selecting means, and contact means operable in response to operation of that one of said plurality of digit-selecting switches representative of the number "zero"; and circuit means associated with said digit-selecting means for enabling coupling of signals from said digit-selecting means to a telephone line;

the invention comprising:

a first Nand gate and a second Nand gate, said first Nand gate having at least two inputs and having an output;

said second Nand gate having at least three inputs and having an output;

said Nand gates being of the type in which an output is at a voltage high if any input is at a voltage low, and which output is at a voltage low if all inputs are at a voltage high;

means coupling said output of first Nand gate to a first input of said second Nand gate and means coupling said output of said second Nand gate to a first input of said first Nand gate to form a Nand gate latch circuit;

an electronic counter, said counter having a reset input, a clock input, an enable input and a plurality of count representative outputs including a first position output and an nth position output;

capacitor means connected in circuit between said output of said first Nand gate and said reset input of said counter and resistor means connected between said reset input and a source of voltage low;

means connecting said output of said second Nand gate to said enable input of said counter;

resistor means connected between a third input of said second Nand gate and a source of voltage high and capacitor means connected between said nth counter output and said third input of said second Nand gate;

means responsive to said telephone set changing from an on-hook to the off-hook condition and vice-versa, respectively, for providing a voltage low pulse to a second input of said first Nand gate or to a second input of said second Nand gate, respectively, including:

relay means having a transfer contact, a break contact, and a make contact; said transfer contact being in contact with said break contact normally and responsive to energization of said relay means for moving into alternate contact with said make contact;

said transfer contact being connected in circuit with a source of voltage low; first input capacitor means connected in circuit between said make contact and said first input of said first Nand gate; second input capacitor means connected between said break contact and said second input of said second Nand gate;

first and second bias resistor means; said first input resistor means being connected between a voltage high source and said make contact; said second input resistor means being connected between a voltage high source and said break contact; third bias resistor means connected between a voltage high source and said first input of said first Nand gate;

means responsive to each operation of said digit-selecting means for providing a corresponding number of pulses to said clock input of said counter;

means, normally disabling said circuit means of said telephone set, coupled to said output of said first Nand gate and responsive to said first Nand gate output being at a voltage high for enabling said circuit means of said telephone set to permit transmission from said station digit-selecting means;

first means coupled to said first counter output and to said output of said first Nand gate and responsive to an output from said counter and, concurrently, a voltage high at said first Nand gate output for providing an output;

semiconductor switch means having an input and an output, normally providing a high at an output and responsive to a high at an input for producing a low at an output; and resistor means connecting said semiconductor switch means output to a second input of said second Nand gate;

means, including relay means, responsive to said output of said first means for interrupting said contact means from a digit-sending circuit in said telephone set and connecting said contact means of said station digit-selecting means, representative of the number zero, in circuit with the input of said semiconductor switch means, whereby operation of said contact means when said counter is at the first output position results in a voltage low at the output of said semiconductor switch means and whereby said semiconductor switch means causes said Nand gates to reset.

* * * * *

UNITED STATES PATENT AND TRADEMARK OFFICE
CERTIFICATE OF CORRECTION

PATENT NO. : 4,000,380
DATED : Dec. 28, 1976
INVENTOR(S) : Joseph Monroe Jackson It is certified that error appears in the above-identified patent and that said Letters Patent are hereby corrected as shown below:

In Column 8, line 12, between the words "'on'" and "applied" insert -- by the "high" --.

Signed and Sealed this

Twenty-ninth Day of March 1977

[SEAL]

*Attest:*

RUTH C. MASON
*Attesting Officer*

C. MARSHALL DANN
*Commissioner of Patents and Trademarks*